Oct. 2, 1928.
L. J. HIBBARD
1,685,950
CIRCUIT INTERRUPTER SYSTEM
Filed June 10, 1922
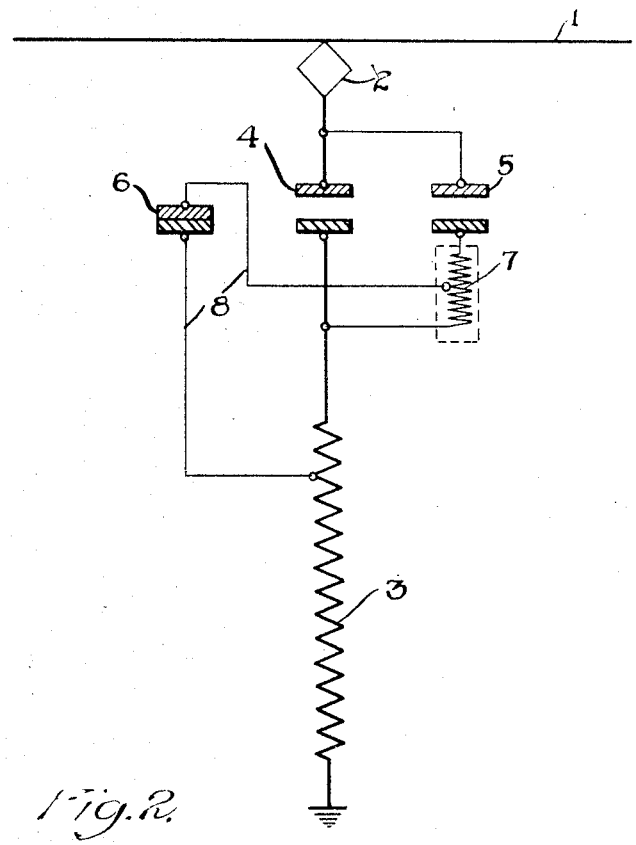
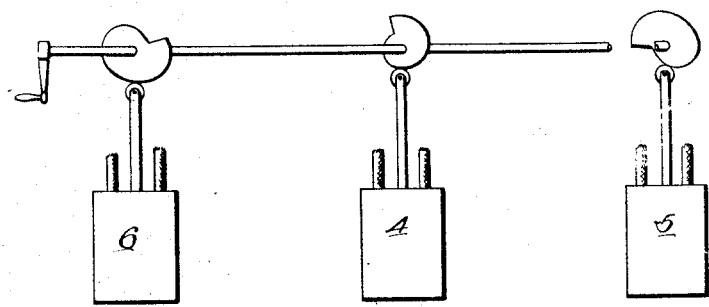
WITNESSES:
INVENTOR
Lloyd J. Hibbard
BY
ATTORNEY Patented Oct. 2, 1928.

1,685,950

UNITED STATES PATENT OFFICE.

LLOYD J. HIBBARD, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER SYSTEM.

Application filed June 10, 1922. Serial No. 567,411.

My invention relates to circuit-interrupter systems that are employed for controlling the flow of current from a high-tension line to a transformer or other electrical apparatus and particularly to means for protecting coils against excessive surges of current therethrough.

My invention has for its object the provision of means for protecting the end turns of coils, such as are employed in transformers, against voltage surges induced therein when (1) breaking the circuit through the transformer, or other apparatus of which the coils form a part, and (2) from surges of current incident to the closing of the circuit on a high wave front.

My invention will best be understood by referring to the drawing, in which:

Figures 1 and 2 are diagrammatic views of one means for practicing my invention.

For convenience, I have shown my invention as applied to a trolley line 1 with which a pantograph current collector 2 coacts to transmit energy to a transformer 3 for supplying an electric vehicle (not shown).

I provide a main switch 4 and auxiliary switches 5 and 6 for controlling the flow of current to the transformer 3, the switch 6 being normally open when the main switch 4 is closed.

In the position shown in the drawing, the circuit through the transformer is broken. When it is desired to connect the transformer 3 to the line 1, the switch 5 is first closed and the switch 6 then opened. A reactor 7, preferably of the air-core type, is thereby connected in the circuit to protect the transformer 3 against a voltage surge in the event that the switch 5 is closed on a high wave front. The main switch 4 may then be closed, thus short circuiting the reactor 7.

In breaking the circuit, the main switch 4 is first opened, followed by the closing of the switch 6 and the opening of the switch 5. A path for dissipating the energy which is stored in the transformer, if the circuit happens to be broken at the peak point of a current wave, is thereby provided across the end turns of the transformer 3 through an auxiliary circuit 8 and the desired number of turns of the reactor 7.

The switches may be of the oil-immersed type and to insure proper sequence of operation, a cam operating device as shown in Fig. 2, may be employed, and for light duty a rotary drum type switch would be effective in producing the desired sequence. In the above said figure, the circuit interrupters 4, 5 and 6 are supposed to be closed when the cam rollers are at their lowest position, and in operating, the cams shown are supposed to be turned clockwise. However numerous other mechanical arrangements capable of effecting the desired sequence of operation of the circuit interrupters will readily be apparent to those skilled in the art.

Heretofore, it has been proposed to employ air-core reactors to guard against excessive surges that occur when opening and closing the circuits of transforming devices, but such arrangement has been found undesirable because, with the reactor constantly under full load, excessive heat is developed in the reactor and in any metal parts that are adjacent thereto. By my arrangement, the desired protection is secured without excessive heating, with the further advantage that the impedance drop produced by my reactor will be in phase with the transformer counter electromotive force set up by the excitation current, and is, therefore, more effective than the resistance formerly employed, which produces a drop of 90° from the excitation counter electromotive force of the transformer.

Various changes in detail and arrangement may be made without departing from the spirit and scope of the invention, as defined by the accompanying claims. For instance, any suitable resistance may be inserted in the auxiliary circuit 8 instead of employing a portion of the reactor as a resistor unit.

I claim as my invention:

1. The combination with a transformer and a supply circuit therefor, of a main switch for interrupting the flow of current to the transformer, a reactor in shunt relation to the main switch, an auxiliary switch between the reactor and the supply circuit, an auxiliary circuit connected across end turns of the transformer and including a portion of the reactor, and a switch for controlling the flow of current through the reactor.

2. The combination with a transformer and a supply circuit therefor, of a main switch for controlling the supply of current to the transformer, a reactor connected in shunt relation to the main switch, an auxiliary circuit connected across end turns of the transformer and including a portion of the reactor therein, and means for making and breaking the auxiliary circuit in predetermined sequence with respect to the operation of the main switch.

3. The combination with a transformer and a supply circuit therefor, of a main switch for controlling the supply of current to the transformer, a reactor connected in shunt relation to the main switch, an auxiliary circuit connected across end turns of the transformer and including a portion of the reactor therein, and means for making and breaking the circuit through the reactor in predetermined sequence with respect to the operation of the main switch.

4. The combination with a transformer and a supply circuit therefor, of a main switch for controlling the supply of current to the transformer, a reactor connected in shunt relation to the main switch, an auxiliary circuit connected across end turns of the transformer and including a portion of the reactor therein, means for making and breaking the circuit through the reactance, and means for controlling the auxiliary circuit.

5. The combination with a transformer and a supply circuit therefor, of a switch for controlling the supply of current to the transformer, a shunt circuit around the switch, an impedance in the shunt circuit, and an auxiliary circuit connected across end turns of the transformer and including a portion of the impedance therein.

6. The combination with a transformer and a supply circuit therefor, of a main switch for controlling the supply of current to the transformer, a reactor connected in shunt relation to the main switch, an auxiliary circuit connected across end turns of the transformer and including a portion of the reactor therein, means for making and breaking the circuit through the reactance, and means for controlling the auxiliary circuit, the said two last mentioned means being operable in one predetermined sequence when closing the main switch and in another sequence when opening the main switch.

7. The combination with an electrical winding and a supply circuit therefor, of a switch for controlling the circuit, an impedance in shunt relation to the switch, and a switch connected across only portions of the said winding and the impedance.

8. The combination with an electrical winding and a supply circuit therefor, of a switch for controlling the circuit, an impedance in shunt relation to the switch, and an auxiliary circuit that includes only portions of the said winding and impedance.

In testimony whereof, I have hereunto subscribed my name this 2nd day of June, 1922.

LLOYD J. HIBBARD.